United States Patent [19]
Boardman

[11] Patent Number: 5,381,129
[45] Date of Patent: Jan. 10, 1995

[54] WIRELESS PET CONTAINMENT SYSTEM

[75] Inventor: Allen H. Boardman, Maryville, Tenn.

[73] Assignee: Radio Systems, Inc., Knoxville, Tenn.

[21] Appl. No.: 216,691

[22] Filed: Mar. 23, 1994

[51] Int. Cl.$^6$ .................. G08B 21/00; A01K 15/02
[52] U.S. Cl. .................................. 340/573; 119/721
[58] Field of Search .................. 340/573, 572, 540; 119/721

[56] References Cited

U.S. PATENT DOCUMENTS

| | | | |
|---|---|---|---|
| 3,478,344 | 11/1969 | Schwitzgebel et al. | 340/312 |
| 3,589,337 | 6/1971 | Doss | 119/29 |
| 3,753,421 | 8/1973 | Peck | 119/721 |
| 4,675,656 | 6/1987 | Narcisse | 340/539 |
| 4,898,120 | 2/1990 | Brose | 119/29 |
| 5,067,441 | 11/1991 | Weinstein | 119/29 |
| 5,121,711 | 6/1992 | Pine | 119/721 |

*Primary Examiner*—Glen Swann
*Attorney, Agent, or Firm*—Luedeka, Neely & Graham

[57] ABSTRACT

A pet containment system uses a transmitter for transmitting a series of electromagnetic signals, and a receiver removably attached to the pet for receiving the series of electromagnetic signals from the transmitter. The transmitter includes means for modulating the electromagnetic signals, means for transmitting the resulting non-random patterns of electromagnetic energy, and at least one transmitting antenna. The receiver includes at least one receiving antenna, means for comparing the signal level of the received electromagnetic signals from said transmitter with a predetermined level and for producing an electronic indication of a loss of signal, means for comparing the phase of the received electromagnetic signals from said transmitter with a reference phase and for producing an electronic indication of a loss of phase, means for producing a warning stimulus to the pet, and means for producing a control stimulus to the pet. The present invention also provides a method for producing an area for the containment of a pet.

15 Claims, 2 Drawing Sheets

WIRELESS PET CONTAINMENT SYSTEM

FIELD OF THE INVENTION

The present invention relates to pet containment systems. More specifically, the present invention relates to those systems which use stimulus means in order to train a pet to remain within a predefined area.

BACKGROUND OF THE INVENTION

For the past twenty years, a number of systems have been developed to provide means for containing pets within a certain predefined area. U.S. Pat. No. 3,753,421 to Peck discloses a system which uses a wire to define the boundary of the area to which the animal is to be restrained. In its most general use, the wire is laid out on the ground or buried a short distance beneath the surface of the ground and then connected to a transmitter system. The transmitter system sets up an electrical field in the wire which determines the boundary of the unit. The pet wears a collar which has a receiver and a stimulus system for providing a stimulus to the pet when the pet moves too close to the wire. Often, the collar contains two stimuli systems, one to give an audio warning to tell the pet that it is approaching the boundary and another to give a shock to further warn the pet that it is too close to the boundary.

This system has enjoyed some success but has a number of limitations in that it is rather expensive to obtain the amount of wire needed for a reasonable area and is time consuming or expensive to bury the amount of wire used. In addition, if the pet is somehow able to go beyond the boundary wire, it will receive a stimulus to keep it away from the wire as it tries to re-enter the desired boundary area. Thus, there is no impetus for the pet to return to the desired area.

U.S. Pat. No. 4,898,120 to Brose sets forth a more sophisticated system in which the parameters of an area in which an animal are to be restrained are determined by evaluating a signal received by a central receiver sent from a transmitter on the animal. This central unit may then transmit a signal to a device worn by the animal to generate a warning shock, sound or the like.

This system enables a more sophisticated determination of the area in which the animal is free to roam and avoids the necessity for exposed wires about the parameter. However, such a system is cumbersome to use.

U.S. Pat. No. 5,06,441 to Weinstein also discloses a wireless system for restricting animals to a defined area. The system of Weinstein uses a transmitting system which generates radio signals to be located in or adjacent an area in which an animal is to be restrained. There is a unit adapted to be worn by the animal which receives the signals from the transmitting system. The collar system has a multiplicity of radio receiver each having a separate receiving antenna.

The system disclosed by Weinstein requires a complexed evaluation of the orientation of the received radio signals. A vector summation is performed on those received signals to determine exactly where the animal is within a particular area. The system requires a large amount of power consumption in the receiver and, therefore, requires recharging or replacement of the battery in the collar every night.

Therefore, there is a need for a wireless pet containment system which is relatively simple to use by the consumer and does not use so much power as to inconveniently require frequent rechargement or replacement of batteries in the pet's collar.

It is an object of the present invention to provide a pet containment system which uses a wireless means to control a pet within a particular area.

It is a further object of the present invention to provide such a system which operates effectively over a reasonably long period of time without frequent replacement or recharging of batteries in a pet collar.

SUMMARY OF THE INVENTION

Having regard to the above and other objects and advantages, the present invention generally provides for a pet containment system which comprises a transmitter for transmitting a series of electromagnetic signals, and a receiver removably attached to the pet for receiving the series of electromagnetic signals from the transmitter. The transmitter further includes means for modulating the electromagnetic signals, wherein the signals are modulated to produce non-random patterns of electromagnetic energy. The transmitter also includes means for transmitting the non-random patterns of electromagnetic energy, and at least one transmitting antenna.

The receiver further includes at least one receiving antenna. There is also means for comparing the signal level of the received electromagnetic signals from the transmitter with a predetermined level and for producing an electronic indication of a loss of signal, wherein if the signal level of the received electromagnetic signals from the transmitter is less than the predetermined level then the electronic indication of a loss of signal is produced. Further, there is means for comparing the phase of the modulation of the received electromagnetic signals from the transmitter with a reference phase and for producing an electronic indication of a loss of phase, wherein if the phase of the received electromagnetic signals from the transmitter is not substantially in phase with the reference phase then the electronic indication of a loss of phase is produced.

The receiver also comprises means for producing a warning stimulus to the pet, and means for producing a control stimulus to the pet. The means for producing the warning and control stimuli operate such that when there is no electronic indication of a loss of signal and there is no electronic indication of a loss of phase, then there is no warning stimulus and there is no control stimulus to the pet. When there is an electronic indication of a loss of signal and there is no electronic indication of a loss of phase, then there is a warning stimulus to the pet. When there is an electronic indication of a loss of signal and there is an electronic indication of a loss of phase, then there is a control stimulus to the pet.

In a preferred embodiment of the present invention, the electromagnetic signals transmitted by the transmitter are frequency modulated. It is further preferred that the frequency modulated electromagnetic signals transmitted by the transmitter are modulated in a pulse train having a particular nonrandom pattern.

In another preferred embodiment of the invention, the means for comparing the signal phase of the electromagnetic signals transmitted by said transmitter further includes means for demodulating the received electromagnetic signals transmitted by the transmitter, thereby producing a demodulated signal, and at least one phase-locked loop for receiving the demodulated signal and for producing an electronic indication of a loss of phase. Thus, when the phase-locked loop indicates that the phase of the demodulated received signal is different than a reference phase then the phase-locked loop generates an electronic indication of a loss of phase.

In yet another preferred embodiment of the present invention, the receiver further comprises a speaker and the warning stimulus includes a sound. In still another preferred embodiment, the receiver further comprises a light source and the warning stimulus includes a light. It is also preferred that the receiver further comprises electrodes and the control stimulus includes a shock to the pet.

It is also preferred that the electromagnetic energy of the non-random patterns of electromagnetic energy is radio frequency energy or light.

The present invention also provides a method for producing an area for the containment of a pet comprising transmitting a series of electromagnetic signals, and attaching a releasable electromagnetic energy receiver to the pet. The step of transmitting the series of electromagnetic signals further includes modulating the electromagnetic signals, wherein the signals are modulated to produce non-random patterns of electromagnetic energy, and transmitting the non-random patterns of electromagnetic energy.

The series of electromagnetic signals is received with the releasable electromagnetic energy receiver, and the signal level of the received electromagnetic signals received with the releasable electromagnetic energy receiver is compared with a predetermined level to produce an electronic indication of a loss of signal. If the signal level of the received electromagnetic signals with the releasable electromagnetic energy receiver is less than the predetermined level then the electronic indication of a loss of signal is produced.

The phase of the demodulated electromagnetic signals received with the releasable electromagnetic energy receiver is also compared with a reference phase to produce an electronic indication of a loss of phase. Thus, if the phase of the received electromagnetic signals with the releasable electromagnetic energy receiver are not substantially in phase with the reference phase then the electronic indication of a loss of phase is produced.

No warning stimulus to the pet is produced when there is no electronic indication of a loss of signal and there is no electronic indication of a loss of phase. A warning stimulus to the pet is produced when there is an electronic indication of a loss of signal and there is no electronic indication of a loss of phase. A control stimulus to the pet is produced when there is an electronic indication of a loss of signal and there is an electronic indication of a loss of phase.

In a preferred embodiment of the invention, the transmitted electromagnetic signals are frequency modulated, and more preferably modulating the transmitted electromagnetic signals in a pulse train having a particular nonrandom pattern.

It is also preferred that the step of comparing the signal phase of the electromagnetic signals received with the releasable electromagnetic energy receiver further includes demodulating the received electromagnetic signals, thereby producing a demodulated signal, and receiving the demodulated signal in at least one phase-locked loop to produce an electronic indication of a loss of phase. Thus, when the phase-locked loop indicates that the phase of the demodulated received signal is different than a reference phase, then the phase-locked loop generates an electronic indication of a loss of phase. It is also preferred that the electromagnetic energy of the non-random patterns of electromagnetic energy is radio frequency energy or light.

BRIEF DESCRIPTION OF THE DRAWINGS

In order to provide a further explanation of the present invention the following drawings are provided in which.

DETAILED DESCRIPTION OF THE INVENTION

Figure 1:
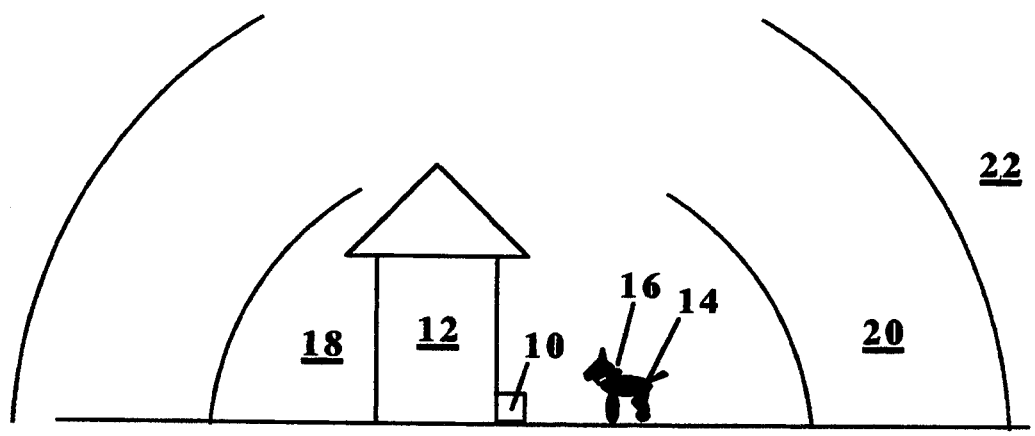
FIG. 1 is a schematic illustration of an environment utilizing the pet containment system of the present invention.

Referring now to the drawings, FIG. 1 is a exemplary drawing of the environment in which the pet containment system of the present invention may be used. A transmitter 10 is generally placed in or near a house 12 which is situated generally within the area to which the pet 14 is to be confined. The pet 14 wears a collar/receiver 16 which contains stimulus systems which give a warning or shock to the pet 14 if the pet wanders too close to the boundaries of the system.

The safe area 18 comprises an area in which the pet receives no stimuli from the collar/receiver 16. When the pet moves into the warning area 20, the collar/receiver 16 gives a warning signal, in the nature of a sound or flashing light or other indication to the pet 14. When the pet 14 moves into the shock area 22, the collar/receiver 16 generates a control signal which is usually a shock to indicate to the pet that it is in a shock area 22. Thus, the pet 14 is trained to remain within the safe area 18 but if the pet 14 moves into the warning area 20 it will be warned to move back into the safe area 18.

Figure 2:
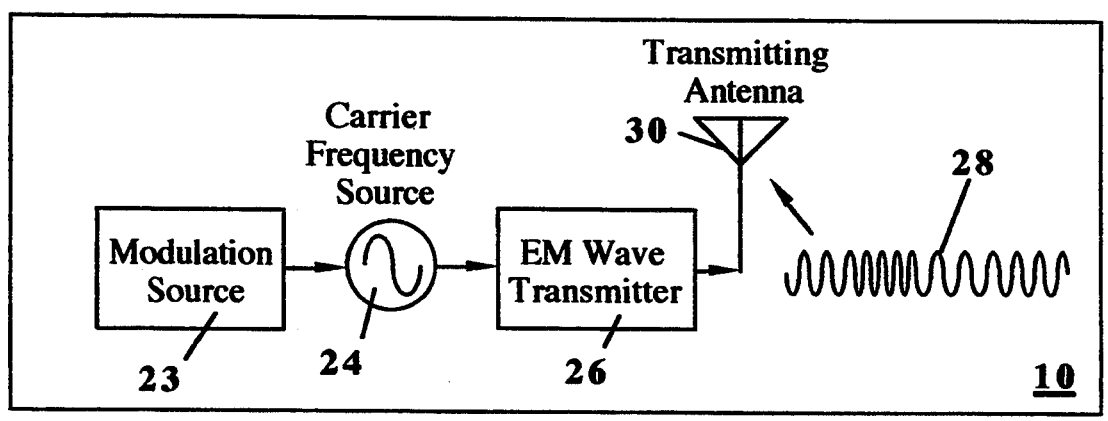
FIG. 2 is a block diagram of a transmitting system according to the present invention.

Referring now to FIG. 2, there is shown a block diagram of an embodiment of the transmitter 10. A modulation source 23 supplies a modulating signal to a carrier frequency source 24. The modulation source 23 modulates the carrier frequency and supplies a modulated signal to an electromagnetic wave transmitter 26. The electromagnetic wave transmitter 26 then sends a signal 28 to a transmitting antenna 30. The transmitted signal 28 is then received by the receiver 16.

Figure 3:
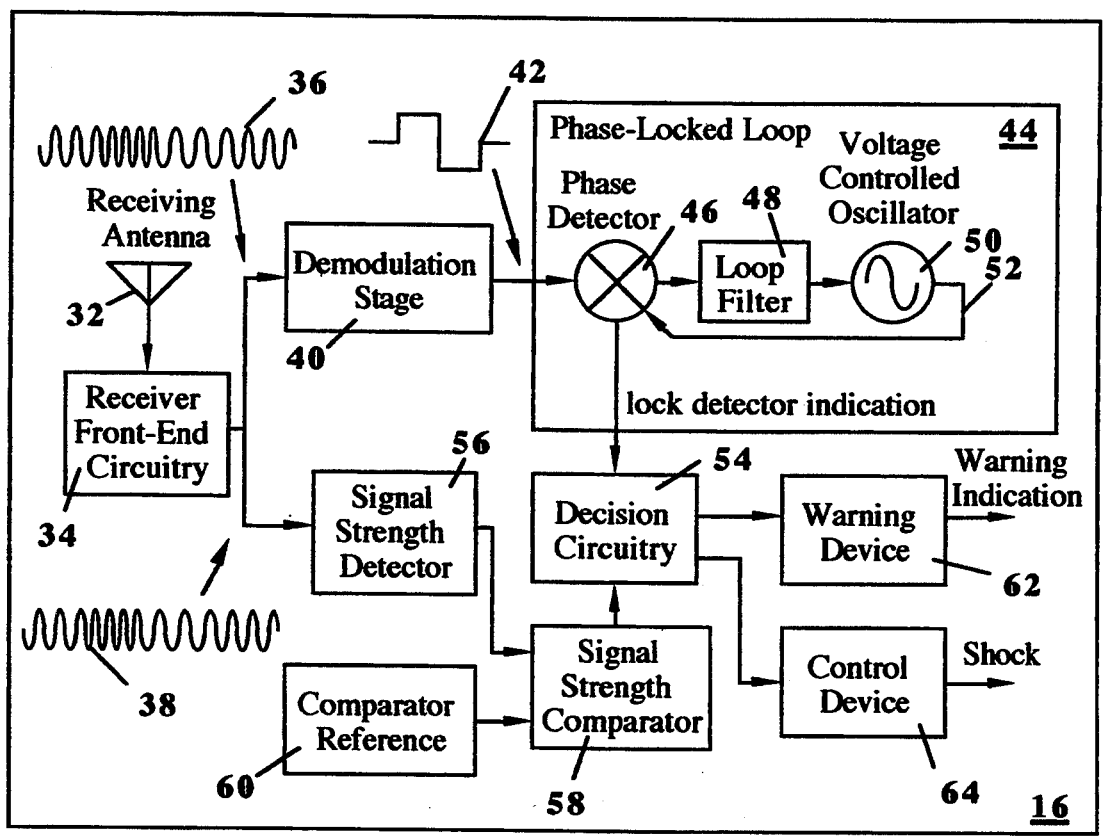
FIG. 3 is a block diagram of one embodiment of a receiver according to the present invention.

FIG. 3 shows a block diagram of a preferred embodiment of a receiver 16 according to the present invention. The transmitted signal 28 is received by the receiving antenna 32 which is then sent to the receiver-front end circuitry 34. The signal is then divided into two signals, a phase detected signal 36 and a strength detected signal 38. Both of these signals are identified by their intended use.

The phase detected signal 36 is sent to a demodulator stage 40 which produces a demodulated signal 42. The demodulated signal 42 is sent to a phase-locked loop 44 for determining whether or not the signal 42 is in phase with the expected signal. A typical phase-locked loop 44 integrated circuit is a CD4046 phase-locked loop.

The phase-locked loop 44 acts as a phase tracker: so long as a phase of the signal is discernable, the output of the phase-locked loop 44 is a constant predetermined voltage level which generally is a logical true value. When the phase is lost, the output of the phase-locked loop 44 lock detector is a logical false value.

A phase detector 46, loop filter 48, and voltage controlled oscillator 50 measure the phase of the signal 42 and determine whether or not it is of the same phase as a reference phase. The feedback loop 52 determines the output of the phase detector 46 and the phase-locked loop 44 to the decision circuitry 54. If the signal 42 is in phase, the output from the phase detector 46 will be a logical true value. Any other phase will generate a logical false value from the phase detector 46. Thus, if the signal is in phase the decision circuitry 54 receives a logical true value signal from the phase detector 46 and receives a logical false value if the system is out of phase.

The strength detected signal 38 is sent to a signal strength detector 56 and is then sent to a signal strength comparator 58. A comparator reference 60 sends a comparison signal to signal strength comparator 58 which then sends an output to the decision circuitry 54. If the signal from the signal strength detector 56 is less than the signal strength from the comparator reference 60, the signal strength comparator 58 sends a signal to the decision circuitry 54 indicating that the strength detected signal 38 has dropped below the particular strength of the comparator reference 60.

The decision circuitry 54 determines whether or not a warning indication or a shock will be given to the pet 14. If the decision circuitry receives a signal from the phase detector 46 and receives no indication from the signal strength comparator 58 that the strength detected signal 38 has dropped below the comparator reference 60, then there will be no warning indication or shock to the pet. Thus, referring now to FIG. 1, the pet 14 is within the safe area 18.

If the pet 14 wanders into the warning area 20, the signal from the phase detector 46 will still be a logical true value since the detected signal will be strong enough to allow the phase locked loop 44 to track its phase. However, the signal strength of the strength detected signal 38 will have dropped below the comparator reference 60. Therefore, the output from the signal strength comparator 58 will indicate to the decision circuitry 54 that a warning is indicated. The decision circuitry 54 will send a signal to the warning device 62 which will give a warning to the pet 14. This warning indication usually is in the form of a sound produced by a small speaker within the collar/receiver 16.

If the pet goes further, into the shock area 22, the demodulated signal 42 will have degraded to a point where it will no longer be in phase. Therefore, the phase detector 46 will generate a logical false value to the decision circuitry 54. In addition, the signal strength comparator 58 will still have produced an indication that the strength detected signal 38 is below that of the comparator reference 60. Therefore, the decision circuitry 54 will generate a signal to the control device 64 which will produce a control signal such as a shock from electrodes in the collar/receiver 16.

Thus, a pet 14 will be signaled that it is in a shock area 22 no matter how far it goes from the transmitter. The only time the shocking will stop will be when the pet re-enters the warning area 20 or the safe area 18.

The transmitted signal 28 may be in the form of a train of modulated signals. Thus, the transmitted signal 28 may contain information particular to the individual transmitter 10 and collar/receiver 16. The particular information may be adjusted, either in the factory or by the consumer, to allow a series of transmitters 10 to be used to form a larger safe area 18 than would be possible with a single transmitter 10. In the alternative, transmitters 10 of neighbors may be adjusted such that both systems use different trains of modulated signals. The collar/receivers 16 would be correspondingly adjusted to allow use with the adjusted transmitter 10.

Thus, it can be seen from the foregoing, that the present invention provides a pet containment system restrains the pet to a particular area without the necessity of wires being buried or being left exposed. In addition, the present system requires little power on the part of the receiver and thus can utilize standard batteries for power.

Having thus described various preferred embodiments of the invention and several of its benefits and advantages, it will be understood by those of ordinary skill that the foregoing description is merely for the purpose of illustration and that numerous substitutions, rearrangements and modifications may be made in the invention without departing from the scope and spirit of the appended claims.

What is claimed is:

1. A pet containment system comprising:
  (a) a transmitter for transmitting a series of electromagnetic signals, wherein said transmitter further includes:
    (1) means for modulating the electromagnetic signals, wherein the signals are modulated to produce non-random patterns of electromagnetic energy,
    (2) means for transmitting the non-random patterns of electromagnetic energy, and
    (3) at least one transmitting antenna; and
  (b) a receiver removably attached to the pet, said receiver for receiving the series of electromagnetic signals from said transmitter, wherein said receiver further includes:
    (1) at least one receiving antenna,
    (2) means for comparing the signal level of the received electromagnetic signals from said transmitter with a predetermined level and for producing an electronic indication of a loss of signal, wherein if the signal level of the received electromagnetic signals from said transmitter is less than the predetermined level then the electronic indication of a loss of signal is produced,
    (3) means for comparing the phase of the received electromagnetic signals from said transmitter with a predetermined phase and for producing an electronic indication of a loss of phase, wherein if the phase of the received electromagnetic signals from said transmitter are not substantially in phase with the reference phase then the electronic indication of a loss of phase is produced,
    (4) means for producing a warning stimulus to the pet, and
    (5) means for producing a control stimulus to the pet, such that when there is no electronic indication of a loss of signal and there is no electronic indication of a loss of phase, then there is no warning stimulus and there is no control stimulus to the pet, when there is an electronic indication of a loss of signal and there is no electronic indication of a loss of phase, then there is a warning stimulus to the pet, and when there is an electronic indication of a loss of signal and there is an electronic indication of a loss of phase, then there is a control stimulus to the pet.

2. The system of claim 1 wherein the electromagnetic signals transmitted by said transmitter are frequency modulated.

3. The system of claim 2 wherein the frequency modulated electromagnetic signals transmitted by said transmitter are modulated in a pulse train having a particular nonrandom pattern.

4. The system of claim 1 wherein said means for comparing the signal phase of the electromagnetic signals transmitted by said transmitter further includes
   (i) demodulating means for demodulating the received electromagnetic signals transmitted by said transmitter, thereby producing a demodulated signal, and
   (ii) at least one phase-locked loop for receiving the demodulated signal and for producing an electronic indication of a loss of phase, wherein when the phase-locked loop indicates that the phase of the demodulated received signal is different than a reference phase then the phase-locked loop generates an electronic indication of a loss of phase.

5. The system of claim 1 wherein the receiver further comprises a speaker and the warning stimulus includes a sound.

6. The system of claim 1 wherein the receiver further comprises a light source and the warning stimulus includes a light.

7. The system of claim 1 wherein the receiver further comprises electrodes and the control stimulus includes a shock to the pet.

8. The system of claim 1 wherein the electromagnetic energy of the non-random patterns of electromagnetic energy is radio frequency energy.

9. The system of claim 1 wherein the electromagnetic energy of the non-random patterns of electromagnetic energy is light.

10. A method for producing an area for the containment of a pet, the method comprising:
    (a) transmitting a series of electromagnetic signals, further including:
        (1) modulating the electromagnetic signals, wherein the signals are modulated to produce non-random patterns of electromagnetic energy, and
        (2) transmitting the non-random patterns of electromagnetic energy;
    (b) attaching a releasable electromagnetic energy receiver to a pet; and
    (c) receiving the series of electromagnetic signals with the releasable electromagnetic energy receiver:
    (d) comparing the signal level of the received electromagnetic signals received with the releasable electromagnetic energy receiver with a predetermined level and producing an electronic indication of a loss of signal, wherein if the signal level of the received electromagnetic signals with the releasable electromagnetic energy receiver is less than the predetermined level then the electronic indication of a loss of signal is produced;
    (e) comparing the phase of the received electromagnetic signals received with the releasable electromagnetic energy receiver with a reference phase and producing an electronic indication of a loss of phase, wherein if the phase of the received electromagnetic signals with the releasable electromagnetic energy receiver are not substantially in phase with the reference phase then the electronic indication of a loss of phase is produced;
    (f) producing no warning stimulus and no control stimulus to the pet when there is no electronic indication of a loss of signal and there is no electronic indication of a loss of phase;
    (g) producing a warning stimulus to the pet when there is an electronic indication of a loss of signal and there is no electronic indication of a loss of phase; and
    (h) producing a control stimulus to the pet when there is an electronic indication of a loss of signal and there is an electronic indication of a loss of phase.

11. The method of claim 10 further comprising frequency modulating the transmitted electromagnetic signals.

12. The method of claim 11 further comprising modulating in a pulse train having a particular nonrandom pattern.

13. The method of claim 10 wherein said comparing the signal phase of the electromagnetic signals received with the releasable electromagnetic energy receiver further includes
    (i) demodulating the received electromagnetic signals, thereby producing a demodulated signal, and
    (ii) receiving the demodulated signal in at least one phase-locked loop and producing an electronic indication of a loss of phase, wherein when the phase-locked loop indicates that the phase of the demodulated received signal is different than a reference phase then the phase-locked loop generates an electronic indication of a loss of phase.

14. The system of claim 10 wherein the electromagnetic energy of the non-random patterns of electromagnetic energy is radio frequency energy.

15. The system of claim 10 wherein the electromagnetic energy of the non-random patterns of electromagnetic energy is light.

* * * * *